Nov. 1, 1960  L. H. BOHMAN  2,958,129
CHEESE CUTTER

Filed Feb. 26, 1958  2 Sheets-Sheet 1

INVENTOR.
Lloyd H. Bohman
BY Carl C. Batz
Attorney.

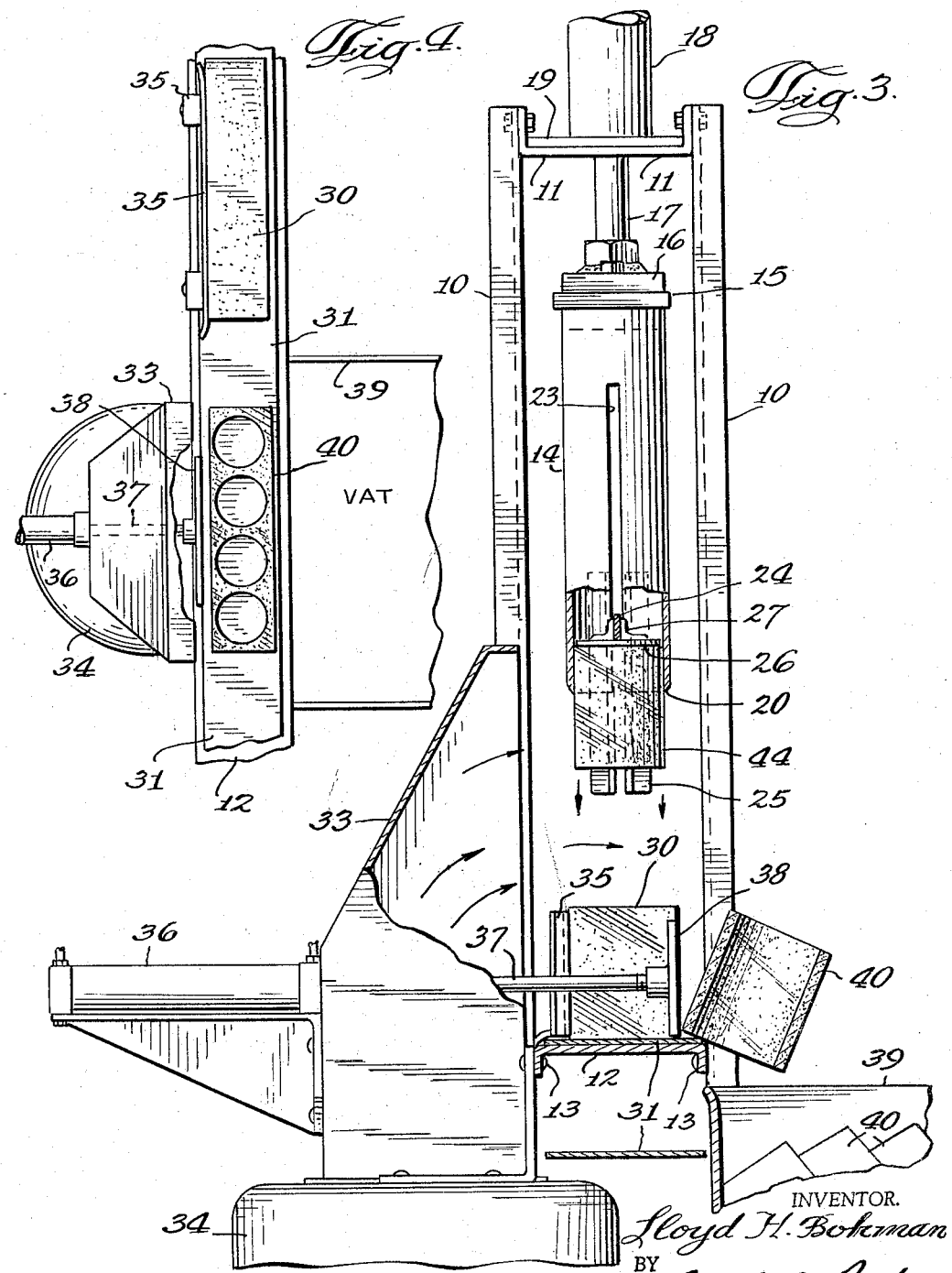

United States Patent Office 2,958,129
Patented Nov. 1, 1960

2,958,129

CHEESE CUTTER

Lloyd H. Bohman, 1209 Washington St., Rochester, Ind.

Filed Feb. 26, 1958, Ser. No. 717,686

4 Claims. (Cl. 31—11)

This invention relates to an apparatus for cutting cheese. The invention is particularly related to an apparatus by which midget longhorns or cylinders of cheese can be cut out of a block of cheese.

The invention is illustrated by the accompanying drawings in which—

Fig. 1 also shows the relationship of the cheese cutters and remover disks in the cutaway portion of the two cutters on the left side of the drawing.

Fig. 3 is a cross-sectional side view of the apparatus as illustrated in Fig. 1 showing in detail the means for removing scraps from the cutting area after the cylinders of cheese have been cut from the cheese block and are carried upward with the cylinders.

Fig. 4 is a top sectional view of the invention showing the means of conveying cheese blocks to and away from the cutter and of removing cheese scraps from the cutting area.

The cheese manufacturing industry has been confronted with consumer demand for their products in a variety of packages and shapes, i.e. in wedges, blocks, slices and midget horns, i.e. a cylindrical form. The methods and apparatus for producing these items are greatly diversified and have been the subject of considerable research and development efforts. Cost and sanitation are both items of primary concern in such methods and apparatus.

It is accordingly the object of this invention to provide a means of producing cheese in the form of a cylinder, the midget horn.

Figure 1:
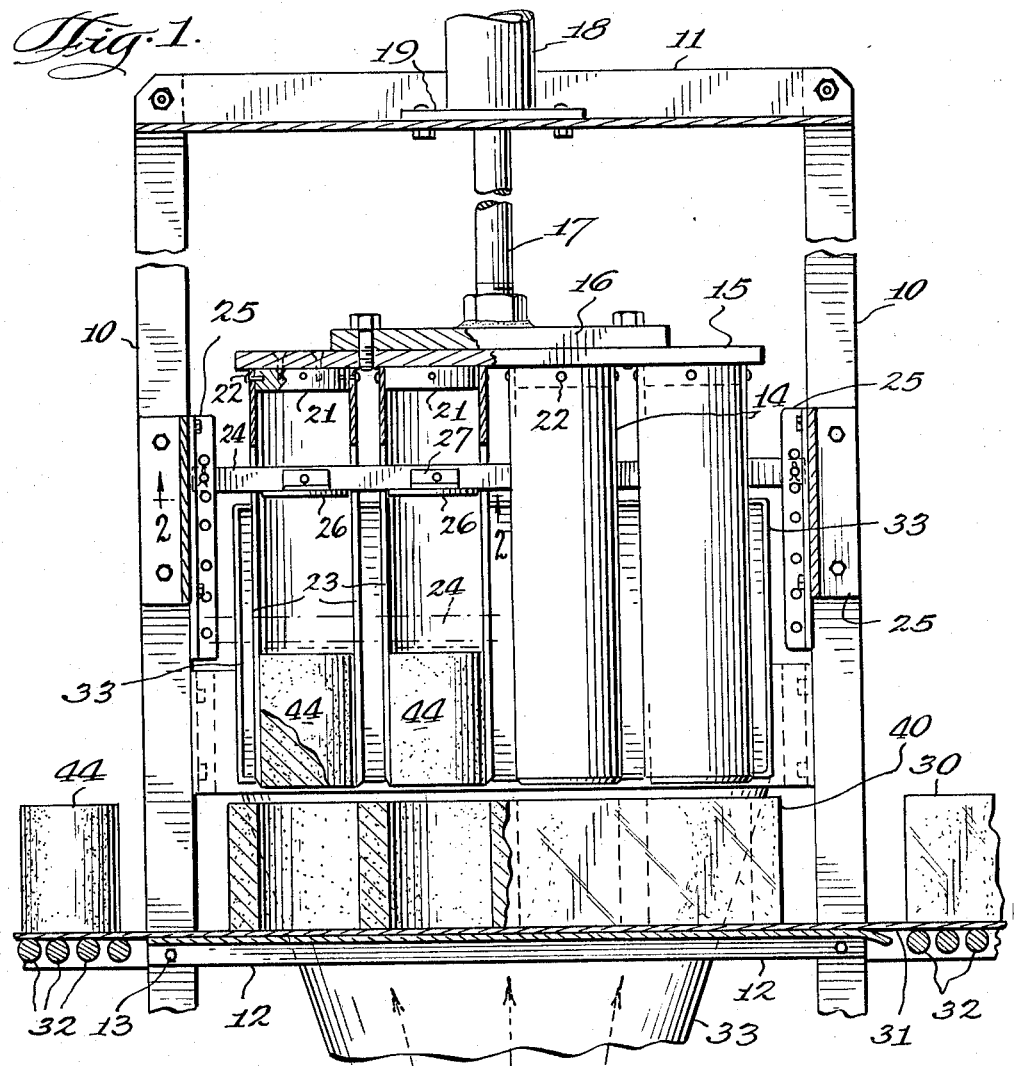
Fig. 1 is a frontal perspective view of the apparatus showing particularly the mounting of the cutters within the machine frame, the mounting of the means for reciprocating the cutters and the means for fixedly mounting the cheese removers.
Figure 2:
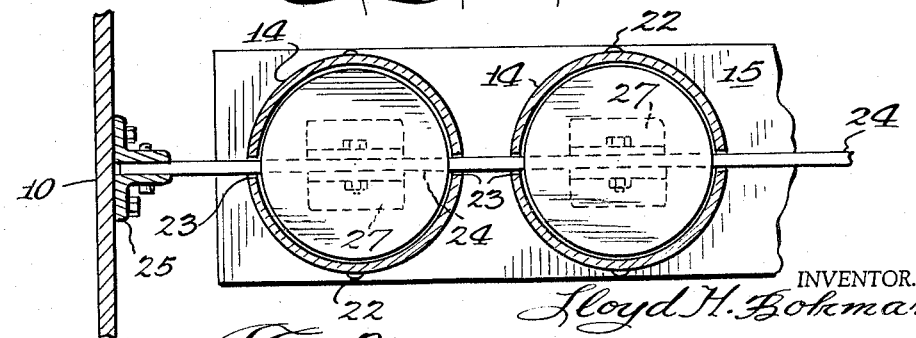
Fig. 2 is a fragmentary cross-sectional view, taken on view lines 2—2 of Fig. 1, illustrating the position of the cheese cylinder removers within the cheese cutters.

Referring now to the drawings it can be seen, particularly in Figs. 1 and 3, that the cheese cutter is mounted within a suitable machine framework comprising the vertical frame members 10, the upper horizontal frame member 11 and the lower member 12. The lower frame member 12 is adjustably mounted at a suitable height on the vertical members 10 by any convenient means such as by means of the bolts 13.

The cylindrical cheese cutters 14 are mounted for reciprocal motion in a vertical direction (along the longitudinal axis of the cutter 14) within the machine frame by means of the horizontal cylinder support bar 15 which is carried upon a flange 16 on the driving rod 17. The driving rod 17 is fixed to the means for imparting reciprocal motion to the cutters 14, that is, to a hydraulic motor 18 as illustrated or any other suitable source of power. The motor 18 or other suitable means for moving the rod 17 and the cutter 14 can be mounted on the horizontal member 11 of the machine frame by means of the motor support 19.

The cheese cutters 14, which may also be called hollow punches, are generally cylindrical in shape with a sharp lower knife edge 20 and are mounted upon the support bar 15 by any convenient means such as by means of the positioning blocks 21 to which the cutters are affixed with the screws 22. Each of the cylinders, which, of course, can be mounted singly or in groups within the apparatus, has longitudinal slot 23 in each side thereof to permit the passage through the cutter of the remover support bar 24 which extends from one side of the frame to the other. The support bar 24 is adjustably mounted at each end on the vertical members 10 by means of the flanges 25. The longitudinal slot 23 permits the reciprocal motion of the cutter 14 while the support bar and remover disks 26 are mounted therein in a stationary fashion. The stationary remover disks 26, which may also be called ejectors, are mounted on the support bar 24 by any convenient means such as the disk flanges 27. The stationary remover disks 26 (each having its perimeter adjacent to the inner periphery of the cutter 14) and the bar 24 which passes through the slots 23 serve to guide and position the cutter in its reciprocal motion during cutting operations.

As illustrated in Fig. 1, the cheese is cut by the cutters as they impinge upon a block of cheese 30 which, in Fig. 1 rests upon a movable belt 31 which in turn is supported by the lower frame member 12. The motion of the belt 31 is facilitated by the rollers 32 on which portions of the belt 31 are supported.

Behind the apparatus of Fig. 1 is the heater hood 33, the means of conveying hot air to the cutters 14 and thereby maintaining the cutters 14 at the desired temperature. The heater hood 33 and the heater 34 are better illustrated in Figs. 3 and 4 wherein arrows indicate the air flow. Figs. 3 and 4 also show a means for removing cheese scraps from the belt 31 after the cutting operation is completed. As shown in Fig. 3, a motor 36 drives a rod 37 which in turn pushes a plate 38 which pushes all cheese scrap materials 40 from the belt 31 into a vat 39 or other convenient receptacle. In the operation of the apparatus a block of cheese 30 is placed on the belt 31, upon which it is conveyed to the cutter. The cheese block 30 is guided into position on the belt either manually or by guide blocks 35 along the belt 31. When the block of cheese arrives within the apparatus, that is, beneath the cylindrical cutters 14, the belt stops and the cutters 14 are driven downward by the motor 18 through the block of cheese 30 thereby cutting cheese cylinders 44 from the cheese block. The cutters 14 then are driven upward and the cylinders 44, which adhere to the cutters 14, are lifted out of the cheese block. The pusher plate 38 is then driven forward and the scraps of cheese 40 are removed from the belt 31. The cutters 14 continue to rise and the cheese cylinders 44 are removed from the cutters since they are prevented from rising with the cutter 14 by the stationary disk removers 26. The cheese cylinders 44 then fall onto the belt 31 and are conveyed away as the next block of cheese is conveyed into position for cutting.

For efficient operation the cutters 14 should be maintained at a temperature in excess of 70° F. The upper limits on the temperature is, of course, determined by the time the cheese is allowed to remain within the cutter 14, and by the temperature at which the cheese is so softened as to become plastic. It is generally desirable that the cutters not be heated to temperatures in excess of 115° F. The preferred temperature of the cutters is about 110° F.

While the invention has been set forth by the specification and drawings in specific detail, it is understood that the invention is susceptible of many variations and modifications, all of which are within the spirit and scope of this invention and of the appended claims.

I claim:

1. An apparatus for cutting cheese comprising a frame, a hollow punch mounted for reciprocal movement on said frame, means connected to said punch for reciprocating said punch along its longitudinal axis, a stationary ejector positioned within said punch and rigidly mounted to said frame for removing cut portions of cheese and guiding and positioning said punch in its reciprocal motion during cutting operations, means mounted to said frame and underlying said punch for supporting cheese to be cut by said punch, means mounted to said frame and synchronized with the movement of said punch for removing cheese scrap materials from said cheese supporting means, and means operatively associated with said punch for maintaining said punch at a temperature of about 70° F. to about 115° F.

2. The apparatus of claim 1 wherein said stationary ejector is in the form of a disk having its perimeter adjacent to the inner periphery of said punch.

3. An apparatus for cutting cheese comprising a frame, a hollow punch mounted for reciprocal movement on said frame, said punch having a longitudinal slot on opposite sides thereof, a stationary ejector positioned within said punch for removing cut portions of cheese and to guide and position said punch in its reciprocal motion during cutting operations, said stationary ejector being rigidly mounted to said frame by means of support bars integral with said ejector and passing through said slots to said frame, a support means underlying said punch for supporting cheese to be cut by said punch, means mounted to said frame and synchronized with the movement of said punch for removing cheese scrap materials from said cheese supporting means, means operatively associated with said punch for maintaining said punch at a temperature of about 110° F., and means connected to said punch for reciprocating said punch along its longitudinal axis.

4. An apparatus for cutting cheese comprising a frame, a hollow punch mounted for reciprocal movement on said frame, said punch having a longitudinal slot positioned on opposite sides thereof, a stationary ejector positioned within said punch for removing cut portions of cheese and to guide and position said punch in its reciprocal motion during cutting operations, said ejector being in the form of a disk having its perimeter adjacent to the inner periphery of said punch and being rigidly mounted to said frame by means of support bars integral with said ejector and passing through said slots to said frame, means mounted to said frame and underlying said punch for supporting cheese to be cut by said punch, means mounted to said frame and synchronized with the movement of said punch for removing cheese scrap materials from said cheese supporting means, means operatively associated with said punch for conveying heated air to said punch and maintaining said punch at a temperature of about 110° F., and means operatively connected to said punch for reciprocating said punch along its longitudinal axis.

References Cited in the file of this patent

UNITED STATES PATENTS

| | | |
|---|---|---|
| 474,243 | Hallenbeck | May 3, 1892 |
| 984,064 | Bingham | Feb. 14, 1911 |
| 2,549,559 | Allison | Apr. 17, 1951 |
| 2,678,493 | Edmunds | May 18, 1954 |